United States Patent [19]

Hira

[11] 4,455,813
[45] Jun. 26, 1984

[54] WALK-BEHIND TYPE WORK VEHICLE

[75] Inventor: Takashi Hira, Sakai, Japan

[73] Assignee: Kubota, Ltd., Osaka, Japan

[21] Appl. No.: 366,271

[22] Filed: Apr. 7, 1982

[30] Foreign Application Priority Data

Apr. 8, 1981 [JP] Japan .............................. 56-51012[U]

[51] Int. Cl.³ .......................................... A01D 35/26
[52] U.S. Cl. ..................................... 56/11.8; 56/16.9; 56/255
[58] Field of Search .................... 56/11.8, 16.9, 255

[56] References Cited

U.S. PATENT DOCUMENTS

| | | | |
|---|---|---|---|
| 2,645,300 | 7/1953 | Watts et al. | 56/11.8 |
| 2,815,633 | 12/1957 | Meyer | 56/11.8 |
| 3,710,563 | 1/1973 | Polette et al. | 56/16.9 |
| 3,790,094 | 2/1974 | Spicer | 56/16.9 |

Primary Examiner—Jay N. Eskovitz
Attorney, Agent, or Firm—Edwin E. Greigg

[57] ABSTRACT

A walk-behind type work vehicle has two running wheels on an axle, an upright power-take-off shaft for driving a selectably attachable implement, as well as an engine with an upright output shaft forwardly upwardly of the running wheels. Transmission system is adapted to transmit the power from the engine output shaft as parallelly divergingly branches off to the running wheels and to the power-take-off shaft.

6 Claims, 3 Drawing Figures

WALK-BEHIND TYPE WORK VEHICLE

BACKGROUND OF THE INVENTION (1) Field of the Invention

This invention relates to a walk-behind type work vehicle provided with two running wheels on an axle, a power-take-off shaft for driving an implment or attachment for instance as a rotary mower or the like, as well as an engine for driving the axle and the shaft; thus of the so-called mono-axle two-wheel type.

(2) Description of the Prior Art

Transmission system adopted in the conventional work vehicles of the above-mentioned type is such that the engine has its output shaft extending in an upright posture, from which the power is transmitted via reduction gears to a transmission shaft extending also in an upright posture, which in adapted to drive the axle via a worm gear, while the power-take-off shaft is disposed again to extend in an upright posture and is adapted to be driven by the said upright transmission shaft via pulley-belting means. A specific example of such work vehicles is seen in JP-Y1 No. SHO. 49 (=1974)-44583.

In the case that the vehicle is adapted to be equipped with such an attachment for instance as a rotary mower as driven by the power-take-off shaft, the said conventional construction results in the vehicle wherein the engine, the wheels and the rotary mower are disposed to span rather a lengthy range in the fore-and-aft direction of the vehicle, thus making it impossible to obtain a compact vehicle.

Another drawback of such construction is further seen in so driving the rotary mower, which should preferably be operated in high rotation, via the upright power-take-off shaft which in turn is driven by the said upright transmission shaft, in view that this latter shaft is rotated through heavy speed reduction for the ultimate proper driving of the running wheels and is thus rather too slow to sufficiently drive the rotary mower to attain the proper cutting performance.

SUMMARY OF THE INVENTION

The primary object of this invention is to eliminate the said drawbacks of such conventional walk-behind work vehicles, thus each provided with an engine having an output shaft, a transmission case, an axle journaled on the transmission case, two running wheels mounted on the axle, and a power-take-off shaft; more specifically to make it possible: to provide a compact vehicle of such type in its overall entirety, to simplify the transmission system from the engine output shaft to the power-take-off shaft, and to drive the power-take-off shaft in relatively high rotation.

In order to attain the said object, the improvement according to this invention comprises in combination that the engine is mounted on the transmission case at a portion thereof forwardly and upwardly of the running wheels, that the engine output shaft is disposed to extend in an upright posture, that the power-take-off shaft is disposed, for driving an implement or attachment, to downwardly protrude in an upright posture through the transmission case in a portion thereof forwardly of the running wheels, and that the transmission system is adapted to transmit the power from the engine output shaft as parallelly divergingly branches off to the running wheels and to the power-take-off shaft.

It is hereby made possible to provide the implement, such for instance as a rotary mower or the like, as located underneath the engine and as snugly accommodated in a space provided forwardly in between the right and left running wheels, to therefore provide the vehicle compact both in the fore-and-aft and right-and-left directions, in its overall entirety as equipped with such implement. Moreover, since the engine power is divergingly split directly from the engine output shaft to the power-take-off shaft and to the axle, the power transmitted to the power-take-off shaft does not undergo the speed reduction for the running wheel driving, thus bringing forth also an advantage of easily attaining the proper cutting performance in the case an implement requiring high speed rotation, as for instance the rotary mower or the like, is actually attached to the power-take-off shaft.

Detailed description to follow hereunder will make apparent still further objects and advantages of this invention.

BRIEF DESCRIPTION OF THE DRAWINGS

The drawings show, by way of example, a walk-behind type work vehicle according to this invention, wherein.

DESCRIPTION OF THE PREFERRED EMBODIMENT

Figure 1:
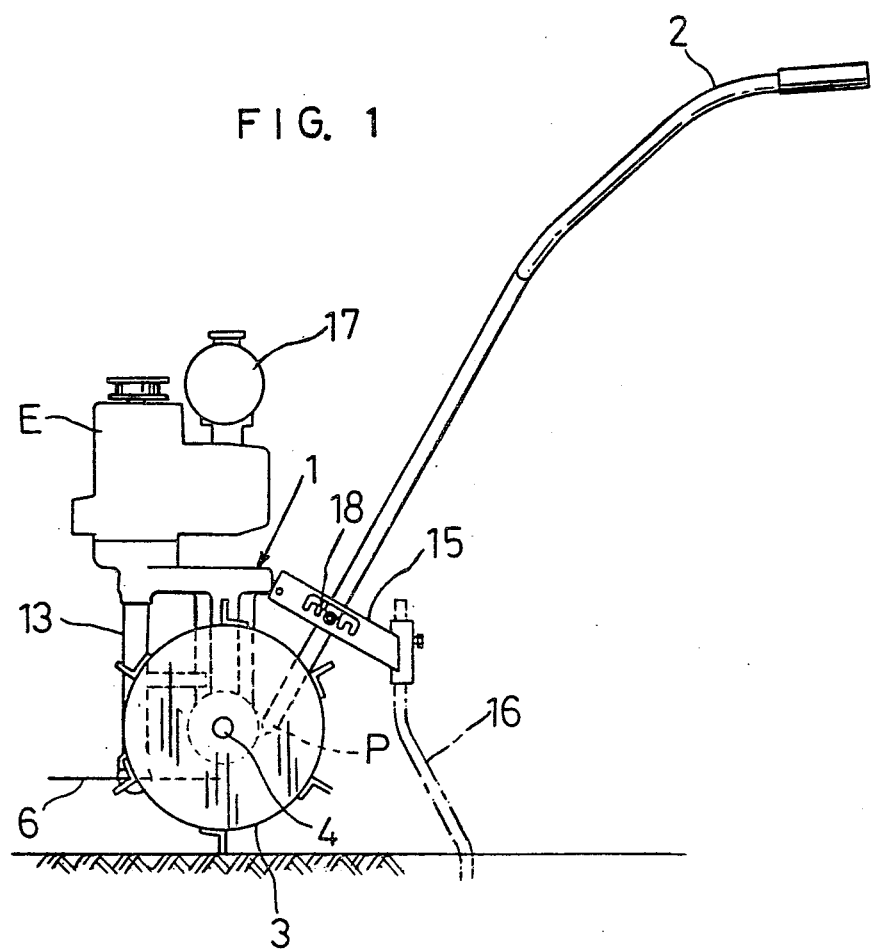
FIG. 1 is an overall side elevation.
Figure 2:
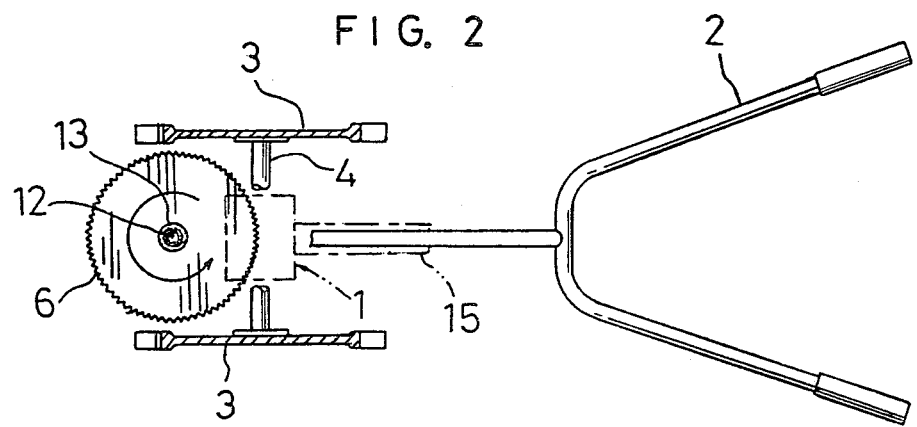
FIG. 2 is a schematic overall plan view.
Figure 3:
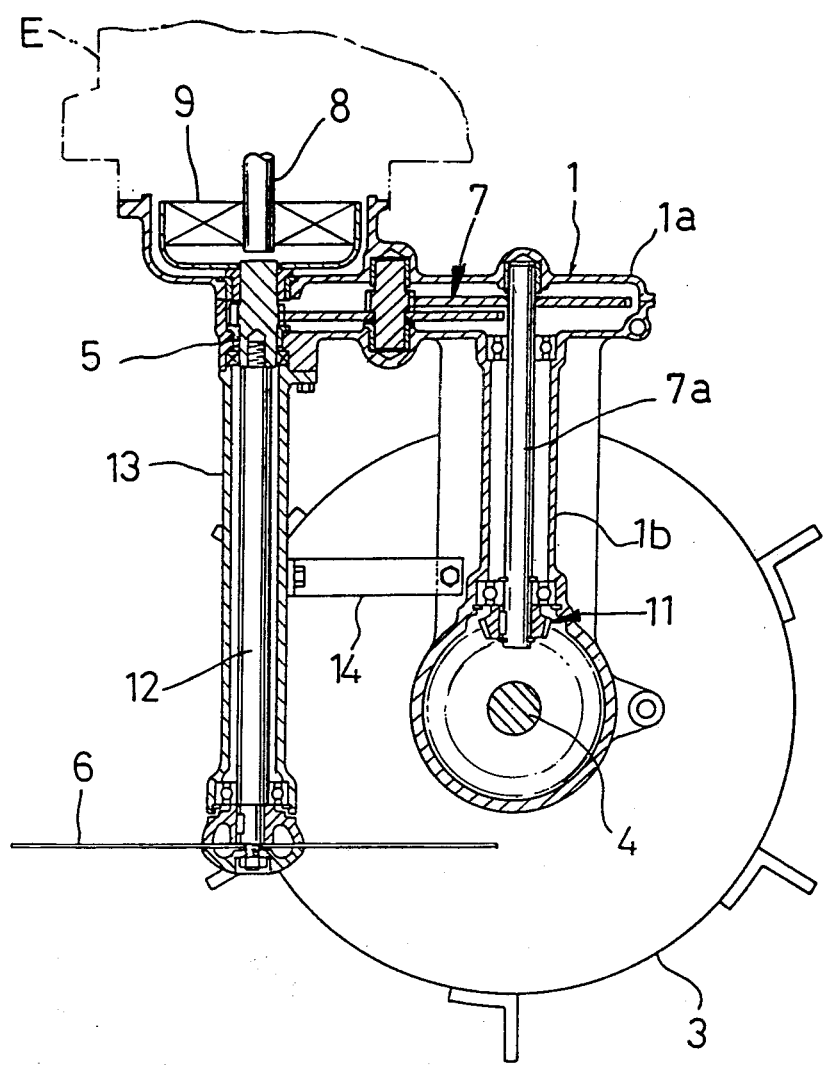
FIG. 3 is an enlarged side elevation of essential parts, partly in section.

Describing in detail the specific embodiment of a walk-behind type grass mower, thus an illustrative example of the work vehicle according to this invention with reference to the drawings, a transmission case (1), in shape generally of an inverted L as viewed in side elevation consists of a first case portion (1a) and a second case portion (1b), and serves as a supporting base for a maneuvering handle (2) disposed to bifurcatedly extend rearwards with respect to the vehicle travel. An engine (E) is mounted on a front end portion of the first case portion (1a). A pair of right and left running wheels (3), (3) are mounted on an axle (4) which is journaled on the second case portion (1b) to extend at a lower end portion thereof. A power-take-off shaft (5) is disposed to extend downwards beneath the engine (E). To the power-take-off shaft (5) there is operatively connected a grass-mowing cutter (6), illustrated as a rotary mower, with intermediary of an after-defined rotary shaft (12); and a transmission system is completed as is adapted to transmit the power from the engine (E) as branches off to the running wheels (3), (3) and to the power-take-off shaft (5), as described more in detail hereunder:

Double-step gearing reduction mechanism (7) is accommodated in a hollow space in between the first and second case portions (1a), (1b). The engine (E) has an output shaft (8) which is operatively connected, via a main clutch (9), to the said power-take-off shaft (5) downwardly extending concentrically in extension to the lower end thereof. Power for driving the axle (4) is transmitted from the said power-take-off shaft (5) via: the said reduction mechanism (7); a vertical transmission shaft (7a) accommodated in the said second case portion (1b) to extend in parallel with the power-take-off shaft (5); and a bevel-gearing mechanism (11).

The already-mentioned rotary shaft (12) carries the said cutter (6) as securely mounted to integrally rotate therewith, and is operatively connectable to the said power-take-off shaft (5), in concentrical extension thereto, by being screwed thereto in a direction opposite to the cutter rotation. A sleeve case (13) to cover the rotary shaft (12) is at its upper end securely bolted to an upper front end portion of the first case portion (1a), and a reinforcement stay (14) is provided to bridge over a lower portion of the sleeve case (13) and a lower portion of the second case portion (1b). The said cutter (6) is so disposed that its major portion, thus over half, on the side to the rear with respect to the vehicle travel is snugly accommodated in a space provided in between the right and left running wheels (3), (3), so that outward scattering of the cut grass scraps may accordingly be abated as the scattering scraps are hindered by the inner lateral side of the running wheels (3), (3).

The handle (2) is connected at its lower end to a rear lower portion of the second case portion (1b), for free pivotal rocking about a horizontal axis (P), and has a portion to engage with a bracket (15), which is pivoted on the second case portion (1b) at a rear upper end portion thereof, more particularly to engage with any one of set mating engagement positioning means provided on the bracket for such free arbitrary selection of the actual egagement position, the selection thus corresponding to accordingly select the slant angle at which the handle (2) extends with respect to the case (1).

The pair of right and left running wheels (3), (3) mentioned hereinabove are mounted on the axle (4) in a manner free to mount and dismount, so that the vehicle may as well be used for various different works other than grass-cutting, such for instance as cultivation work and the like, by mounting the respective proper implements instead of the said running wheels (3), (3) and, when needed, by further mounting a ground-engaging resistor bar (16) on the said bracket (15) as shown in phantom in FIG. 1. Designated in FIG. 1 at (17) is a fuel tank.

As for the cutter (6), same is not limited or restricted to be of the rotary disc blade type as described hereinbefore but may as well be of the reciprocating clipper type, and this invention may be applied also to such case.

By the way, though the single power-take-off shaft (5) in the above-described specific embodiment is the one serving as an input shaft of the transmission system, as is operatively connected to the engine output shaft (8) with intermediary of the main clutch (9), such is not necessarily the imperative requirement of this invention and some other construction may as well be possible, such for instance as providing individually separate input shaft and power-take-off shaft as operatively connected in straight concentrical extension with each other or as juxtaposed within a common plane and operatively connected with each other by gearing or chain means, what is essential to this invention being thus to provide both the engine output shaft (8) and the power-take-off shaft (5) in uprightly extending posture and to provide the output end of the power-take-off shaft (5) on the side protruding downwards.

I claim:

1. A walk-behind type work vehicle comprising an engine, a transmission casing below said engine, an output shaft extending from said engine downwardly toward said transmission casing, a main clutch operatively connected to said output shaft, and to a power take-off shaft which extends downwardly to said transmission casing, an axle journaled on one end of said transmission casing, two running wheels mounted on said axle and rotatable thereby, and a steering handle secured to said vehicle, in which:

said transmission casing comprising a first case portion extending substantially horizontally relative to said engine and a second casing portion extending substantially vertically from a rear part of the first casing portion, thereby constituting substantially an inverted L-shape in side view, said first casing portion carries at a forward part thereof said engine and said power-takeoff shaft extending downwardly to drive a working implement, the power-takeoff shaft being operatively connected to the output shaft via said clutch, said second casing portion housing a transmission shaft operatively connected to the output shaft through a reduction drive mechanism housed in said first casing portion and to said axle disposed relative to said second casing portion, said second casing portion provides space between a bottom of the first case portion and tops of the running wheels and a rotary shaft in axial alignment with said power-takeoff shaft, and driven thereby.

2. The vehicle of claim 1, wherein the said transmission shaft and the power-take-off shaft are disposed substantially in alignment in the fore-and-aft direction with each other, thus commonly to lie in such longitudinal plane in parallel with each other.

3. The vehicle of claim 1, equipped with a grass-mowing cutter, attached as an implement to said rotary shaft driven by the power-take-off shaft, in such disposition as snugly accommodated in a space provided in between the running wheels that outward scattering of the cut grass scraps may accordingly be abated as the scattering scraps are hindered by the inner lateral side of the running wheels.

4. The vehicle of claim 1, wherein the engine output shaft and the power-take-off shaft are disposed in a continual straight concentrical extension with each other and are operatively interconnected by said clutch.

5. The vehicle of claim 3, further comprising a rotary shaft functions as a medium for transmitting the power from the power-take-off shaft to the cutter, this rotary shaft being secured directly to the power-take-off shaft and the cutter being in turn secured directly to this rotary shaft.

6. The vehicle of claim 5, further comprising a sleeve case incasing and journaling the said rotary shaft therein; the sleeve case and the rotary shaft being provided for free mounting and dismounting with respect to the transmission case and the power-take-off shaft, respectively.

* * * * *